United States Patent
Lorch et al.

(10) Patent No.: US 11,444,374 B2
(45) Date of Patent: Sep. 13, 2022

(54) LIGHTNING ROD

(71) Applicant: HENSOLDT SENSORS GMBH, Taufkirchen (DE)

(72) Inventors: Ralf Lorch, Elchingen (DE); Rainer Mueller, Neu-Ulm (DE); Markus Forkel, Ulm (DE)

(73) Assignee: HENSOLDT SENSORS GMBH, Taufkirchen (DE)

( * ) Notice: Subject to any disclaimer, the term of this patent is extended or adjusted under 35 U.S.C. 154(b) by 204 days.

(21) Appl. No.: 16/906,318

(22) Filed: Jun. 19, 2020

(65) Prior Publication Data

US 2020/0403303 A1 Dec. 24, 2020

(30) Foreign Application Priority Data

Jun. 21, 2019 (EP) .................................... 19181664

(51) Int. Cl.
*H01C 7/12* (2006.01)
*H01Q 1/50* (2006.01)
*H01F 38/14* (2006.01)
*H02G 13/00* (2006.01)
*H01H 47/00* (2006.01)

(52) U.S. Cl.
CPC .............. *H01Q 1/50* (2013.01); *H01C 7/12* (2013.01); *H01F 38/14* (2013.01); *H01H 47/00* (2013.01); *H02G 13/00* (2013.01); *H02G 13/40* (2013.01)

(58) Field of Classification Search
CPC .......... H01C 7/12; H01Q 1/50; H01Q 1/1228; H01F 38/14; H02G 13/00; H02G 13/80; H02G 13/40; H01R 4/66; H01H 47/00; H02H 1/00

USPC ..................................... 361/212, 220, 218
See application file for complete search history.

(56) References Cited

U.S. PATENT DOCUMENTS

| | | | |
|---|---|---|---|
| 6,307,149 B1 | 10/2001 | Zini et al. | |
| 7,236,341 B1 * | 6/2007 | Carpenter, Jr. | H02G 13/00 361/117 |
| 7,495,168 B2 * | 2/2009 | Park | H02G 13/80 361/216 |
| 7,960,647 B2 * | 6/2011 | Rizk | H02G 13/80 361/220 |
| 2007/0115607 A1 * | 5/2007 | Rizk | H02G 13/00 361/220 |

(Continued)

FOREIGN PATENT DOCUMENTS

| | | |
|---|---|---|
| DE | 102010053639 A1 | 6/2012 |
| DE | 102016107869 A1 | 11/2016 |
| GB | 1476658 A | 6/1977 |

OTHER PUBLICATIONS

Extended European Search Report dated Nov. 27, 2019 in related/corresponding EP Application No. 19181664.4.

*Primary Examiner* — Danny Nguyen
(74) *Attorney, Agent, or Firm* — Patent Portfolio Builders PLLC (57) ABSTRACT

A lightning rod for protecting an antenna system involves a lightning rod having a plurality of sections. Each section of the plurality of sections has a dimension. The dimension is less than a quarter of a wavelength according to an operating frequency of the antenna system to be protected. The plurality of sections is inductively coupled. The lightning rod can also be part of a group of lightning rods, and a system of a lightning rod or a group of lightning rods with an antenna system.

9 Claims, 5 Drawing Sheets

(56) References Cited

U.S. PATENT DOCUMENTS

| | | | |
|---|---|---|---|
| 2014/0262410 A1* | 9/2014 | Behr | H02G 13/00 |
| | | | 174/3 |
| 2015/0214711 A1* | 7/2015 | Matveev | H02G 13/00 |
| | | | 174/2 |
| 2017/0201002 A1* | 7/2017 | Huggins | H01Q 1/02 |
| 2018/0212414 A1* | 7/2018 | Behr | E04H 12/18 |

* cited by examiner

LIGHTNING ROD

CROSS-REFERENCE TO RELATED APPLICATIONS

This application claims priority under 35 U.S.C. § 119 to EP 19 181664.4, filed on Jun. 21, 2019, the entire disclosure of which is herein expressly incorporated by reference.

TECHNICAL FIELD

Exemplary embodiments of the invention relate to protecting against lightning strikes and applications thereof, and in particular to lightning rods for protecting an antenna system, a method for protecting an antenna system, a group of lightning rods and a system comprising the group of lightning rods and the antenna system.

BACKGROUND

Lightning rods may have to be optimized with respect to reduction of antenna system performance influence. Nevertheless, it is desired to form lightning rods to protect against lightning strikes.

TECHNICAL PROBLEM

There may be a demand to provide concepts for lightning rods having a reduced impact on an antenna system performance.

SUMMARY

According to a first aspect, a lightning rod for protecting an antenna system is provided. The lightning rod has a plurality of sections. Each section of the plurality of sections has a dimension (e.g., a length or direction in maximal extension or longitudinal direction). The dimension is less than a quarter of a wavelength according to an operating frequency of the antenna system to be protected. The plurality of sections is inductively coupled. The antenna system may be operable in predetermined frequency band with the operating frequency included therein.

By use of this section based lightning rod, negative influence on an antenna performance may be reduced, whereas lightning protections may be provided, simultaneously.

The antenna system may comprise or may be an antenna. The antenna system may comprise or may be an antenna array. Further, the antenna system may also comprise downstream elements, for example a receiving unit and/or a transmitting unit. For example, the antenna system may be part of a transmitter, receiver or a transceiver.

The lightning rod may be configured to be positioned at an exposed part of a building or other tall structure to divert lightning harmlessly into ground. For example, the lightning rod may be used as or be a lightning arrester rod or a lightning arresting bar. Especially, the lightning rod may be intended to protect the antenna system from a lightning strike.

If lightning is to hit the antenna system, it will preferentially strike the lightning rod and be conducted to ground through a wire, instead of passing through the structure, where it could start a fire. The Lightning rods may also be called strike termination device.

The lightning rod may be a single component of a lightning system. The lightning rod may also have a connecting interface to earth in order to perform its protective function. The lightning rod may be made of conductive material(s), such as copper or aluminum.

The plurality of sections may also be understood as parts of the lightning rod along the longitudinal direction.

The term "inductive coupling" may be understood as coupling in an electrically inductive way. Since any conductor has a given inductivity, this term shall relate to additionally formed elements with a dedicated inductivity.

The plurality of sections may be concatenated with each other in a longitudinal direction along a common direction of each of the plurality of sections.

The common direction may be in a direction of the dimension of each section of the plurality of sections. The common direction may be predetermined by a longitudinal direction of the lightning rod (itself).

Each section end of one section of the plurality of sections may be inductively coupled to a section end of (for example exactly) one other section of the plurality of sections.

The respective dimensions of each of the plurality of sections may be less than one-sixth of the wavelength of the operating frequency of the antenna system to be protected.

The term "dimension" may be understood herein as a length. For example, the dimension of each section of the plurality of sections may be defined as length of each section of the plurality of sections. For example, the length of each section of the plurality of sections may be similar or the same. The term "dimension of the lightning rod" may be referred to as length or height (in vertical direction, when in use). For example, the length or height of the lightning rod may be 4 m (or 5 m or 6 m or 7 m or 8 m or 9 m or 10 m). In particular, the dimension of the lightning rod may be greater than 4 (or 5 or 6 or 6 or 7 or 8) times a dimension (magnitude) of the wavelength. The lightning rod may be at least higher than the (a height of the) antenna system or 1.5 (or 2 or 2.5 or 3 or 3.5 or 4) times as high as the (height of the) antenna system. The height of the antenna system may depend on a lightning protection class and can therefore vary.

The lightning rod is for example an elongated rod.

In an example, the elongated rod may be a segmented rod, which parts are the sections connected (for example in a consecutive order) along the longitudinal direction of the lightning rod. The dimension of the respective sections may extend in the longitudinal direction of the lightning rod.

Further, the elongated rod may be a single metallic rod. The sections in this case are, for example, not directly next to each other. The sections in this example form part of the elongated metallic rod. Further, the sections are in this example separated by a part of the same metallic rod.

The sections of the plurality of sections may be inductively coupled by inductive coupling elements, respectively. Thus, between each section of the plurality of sections may be (for example exactly) one of the inductive coupling elements. Consequently, each one of the inductive coupling elements connects two consecutive sections of the plurality of sections.

Each of the inductive coupling elements may have a dimension that is less than one half of the dimension of each of the plurality of sections.

The dimension of each of the inductive coupling elements may be defined as a length. This length may be the space between two consecutive sections of the plurality of sections.

For example, the sections may not be directly connected. In this case, the sections may be segments, for example metallic individual elements or metallic individual rods.

These segments can be coupled to one another via a respective one of the inductive coupling elements. For example exactly one of the inductive coupling elements between two adjacent sections. By arranging the plurality of sections and the inductive coupling elements one after the other, the elongated body may be formed. Then the lightning rod may have a sufficient height for protecting against lightning strikes.

Consecutive sections of the plurality of sections may be directly connected by a respective one of the inductive coupling elements. Consecutive (neighboring) sections of the plurality of sections may be inductively coupled by (exactly) one coupling element.

The inductive coupling elements may be air coils, for example wound wires.

The inductive coupling elements may be coils with respective damping elements, for example resistors. The coils and the resistors may be respectively connected in parallel.

The lightning rod may have a metallic rod, and wherein consecutive sections of the plurality of sections are inductively coupled by a ferrite arranged around the metallic rod between the consecutive sections of the plurality of sections.

The metallic rod may be formed continuously. For example, the metallic rod has no interruption. In this case, one ferrite, for example exactly one ferrite, can be arranged between the sections of the plurality of sections. The sections of the plurality of sections may in this case be parts of the continuous metallic rod. Here, the inductive coupling may be provided by respective ferrites arranged around the metallic rod at distances corresponding to the respective dimensions of the sections of the plurality of sections. The ferrites may be in the form of ferrite sleeve. They may be easily imposed on an already existing lightning rod. The ferrites may also be in the form of folding or foldable ferrites. These may also be easily arranged at an already existing lightning rod. Further, the ferrites may be in the form of an attachable ferrite tape, which can be easily attached at an already existing lightning rod.

The operating frequency may be a frequency of an operating frequency range of the antenna system to be protected.

The operating frequency may have a frequency between a lowest and highest frequency of the operating frequency range of the antenna system to be protected. Specifically, the operating frequency may be a lowest frequency or a highest frequency of the operating frequency range of the antenna system to be protected.

A number of sections of the plurality of sections may be at least N. A number of the inductive coupling elements may be at least N−1. N may be a natural number greater than 3 (or 4 or 5 or 6 or 7 or 8 or 9 or 10).

According to a second aspect, a method of providing lightning protection is provided. The method comprises providing a plurality of sections for a lightning rod. Each section of the plurality of sections has a dimension less than a quarter of a wavelength according to an operating frequency. The method further comprises inductive coupling of the plurality of sections to form the lightning rod.

According to a third aspect, a method of providing lightning protection is provided. The method comprises providing a lightning rod, for example an existing lightning rod, with inductive coupling elements at a distance to each other of less than a quarter of a wavelength according to an operating frequency.

According to another aspect, the method the step of providing a lightning rod with inductive coupling elements may include a step of providing a rod and the step of arranging or forming of inductive coupling elements in a distance to each other of less than a quarter of a wavelength according to the operating frequency. Therefore, embodiments relate also to a retrofitting of existing lightning rods to suppress interactions between the antenna system and the retrofitted lightning rod. The interactions are suppressed because the length of each segment is too short to deteriorate the radiation characteristics of the antenna system.

The lightning rod may be located in a vicinity of an antenna system to be protected.

According to a fourth aspect, a group of lightning rods is provided. Each of the lightning rods may be a lightning rod according to the first aspect. Specifically, each of the lightning rods includes a plurality of sections, wherein each section of the plurality of sections extends in a longitudinal direction less than a quarter of a wavelength according to an operating frequency of the antenna system to be protected, wherein neighboring sections of the plurality of sections are inductively coupled. The lightning rods may be adapted to surround an antenna system.

According to a fifth aspect, a system of a lightning rod according to the first aspect or a group of lightning rods according to the fourth aspect and an antenna system is provided. Specifically, the system includes an antenna system and a lightning rod or a group of lightning rods, wherein the lightning rod or each lightning rod of the group of lightning rods comprises a plurality of sections, wherein each section of the plurality of sections extends in a longitudinal direction less than a quarter of a wavelength according to an operating frequency of the antenna system to be protected, wherein neighboring sections of the plurality of sections are inductively coupled.

The lightning rod according to the first aspect may be arranged in a vicinity/environment of the antenna system. The lightning rods of the group of lightning rods according to the fourth aspect may be arranged around the antenna system in the vicinity of the antenna system.

The distance between the lightning rod(s) and the antenna system as well as the dimension of the lightning rod(s) may be calculated using a method for determining protection areas, such as the rolling sphere method, the protective angle method, the mesh method, or a combination thereof.

The dimension of the lightning rod(s) may be defined as a vertical extension, for example a height. The lightning rod(s) may also extend over the antenna system. This may be due to an inclination at an upper end of the lightning rod(s) (inclined, aslant).

Even if some of the aspects described above have been described in reference to the lightning rod, these aspects may also apply to method (second and third aspects), the group of lightning rods and the system. Likewise, the aspects described above in relation to method (second and third aspects) may be applicable in a corresponding manner to the lightning rod, the group of lightning rods and the system. Further, the aspects described above in relation the group of lightning rods may be applicable in a corresponding manner to the lightning rod, the group of lightning rods, the method (second and third aspects) and the system. Furthermore, the aspects described above in relation to the system may be applicable in a corresponding manner to the lightning rod, the group of lightning rods, the method (second and third aspects) and the group of lightning rods.

It is also to be understood that the terms used herein are for purpose of describing individual embodiments and are not intended to be limiting. Unless otherwise defined, all technical and scientific terms used herein have the meaning that corresponds to the general understanding of the skilled person in the relevant technical field of the present disclosure; they are to be understood as neither too broad nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as e.g. "comprising" "including" or "having" etc. mean the presence of the described features, numbers, operations, acts, components, parts, or combinations thereof, and do not exclude the presence or possible addition of one or more further features, numbers, operations, acts, components, parts or their combinations.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same or similar components are always provided with the same or similar reference symbols. In the description of the present disclosure, detailed explanations of known connected functions or constructions are omitted, insofar as they are unnecessarily distracting from the present disclosure. The accompanying drawings are illustrative of the present disclosure and are not to be construed as a limitation.

BRIEF DESCRIPTION OF THE DRAWINGS

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION

The lightning rod, the group of lightning rods, the system and the methods will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

Figure 1:
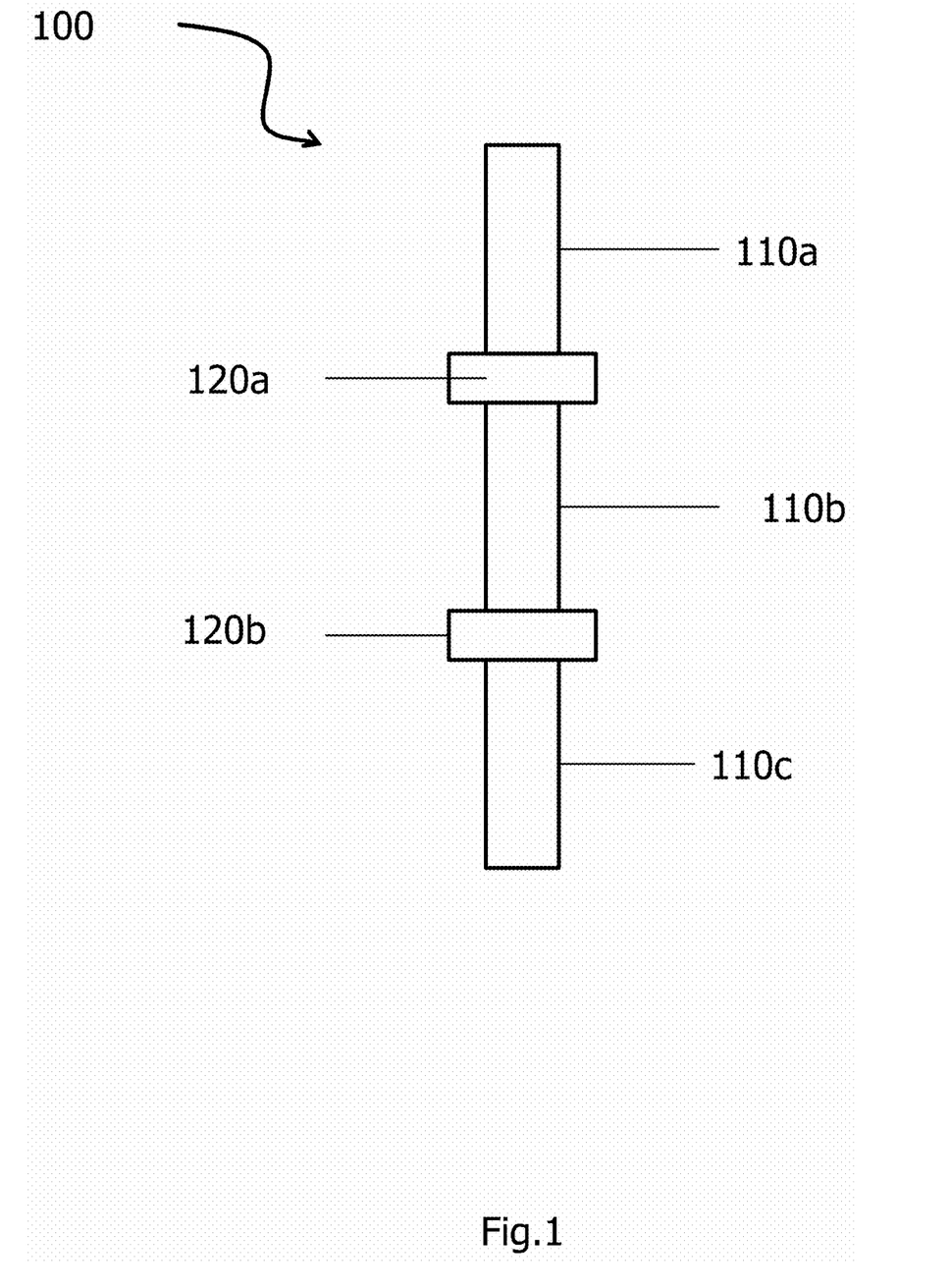
FIG. 1 schematically illustrates a lightning rod for protecting an antenna system against lightning strikes.

FIG. 1 schematically illustrates a lightning rod (100) for protecting an antenna system against lightning strikes. The lightning rod (100) has a plurality of sections (110a, 110b, 110c). Each section of the plurality of sections (110a, 110b, 110c) has a dimension. The dimension is less than a quarter of a wavelength according to an operating frequency of the antenna system to be protected. The plurality of sections (110a, 110b, 110c) is inductively coupled.

The lightning rod (100) may be a single component of a lightning system. The lightning rod (100) may also have a connecting interface to earth in order to perform its protective function. The lightning rod (100) may be made of conductive material(s), such as copper or aluminum.

The plurality of sections (110a, 110b, 110c) may also be understood as parts of the lightning rod (100) along the longitudinal direction. In FIG. 1, the longitudinal direction is upwards.

The plurality of sections (110a, 110b, 110c) may be concatenated with each other in a longitudinal direction along a common direction of each of the plurality of sections (110a, 110b, 110c).

The common direction may be in a direction of the dimension of each section of the plurality of sections (110a, 110b, 110c). The common direction may be predetermined by a longitudinal direction of the lightning rod (100) (itself).

Each section end of one section of the plurality of sections (110a, 110b, 110c) may be inductively coupled to a section end of (for example exactly) one other section of the plurality of sections (110a, 110b, 110c).

The lightning rod (100) is for example an elongated rod.

The elongated rod may be a segmented rod, which parts are the sections (110a, 110b, 110c) connected (for example in a consecutive order) along the longitudinal direction of the lightning rod (100). The dimension of the respective sections (110a, 110b, 110c) may extend in the longitudinal direction of the lightning rod (100).

Further, the elongated rod may be a single metallic rod. The sections (110a, 110b, 110c) in this case are not, for example, directly next to each other. The sections (110a, 110b, 110c) may form part of the elongated metallic rod. Further, the sections (110a, 110b, 110c) may be separated by a part of the same metallic rod.

The sections (110a, 110b, 110c) of the plurality of sections (110a, 110b, 110c) may be inductively coupled by inductive coupling elements (120a, 120b), respectively. Thus, between each section of the plurality of sections (110a, 110b, 110c) may be (for example exactly) one of the inductive coupling elements (120a, 120b). Consequently, each one of the inductive coupling elements (120a, 120b) connects two consecutive sections of the plurality of sections (110a, 110b, 110c).

Each of the inductive coupling elements (120a, 120b) may have a dimension that is less than one half of the dimension of each of the plurality of sections (110a, 110b, 110c).

The dimension of each of the inductive coupling elements may be the space between (for example exactly) two consecutive sections of the plurality of sections (110a, 110b, 110c).

For example, the sections (110a, 110b, 110c) may not be directly connected. In this case, the sections (110a, 110b, 110c) may be segments, for example metallic individual elements or metallic individual rods. These segments can be coupled to one another via a respective one of the inductive coupling elements. For example, exactly one of the inductive coupling elements (120a, 120b) is arranged between two adjacent sections (110a, 110b, 110c). By arranging the plurality of sections (110a, 110b, 110c) and the inductive coupling elements (120a, 120b) one after the other, the elongated body may be formed. Then the lightning rod (100) may have a sufficient height for protecting against lightning strikes.

Consecutive sections (110a, 110b, 110c) of the plurality of sections (110a, 110b, 110c) may be directly connected by a respective one of the inductive coupling elements (120a, 120b). Consecutive (neighboring) sections (110a, 110b, 110c) of the plurality of sections (110a, 110b, 110c) may be inductively coupled by (exactly) one coupling element.

The inductive coupling elements (120a, 120b) may be air coils, for example wound wires.

The inductive coupling elements (120a, 120b) may be coils with respective damping elements, for example resistors. The coils and the resistors may respectively be connected in parallel.

The lightning rod (100) may have a metallic rod, and wherein consecutive sections (110a, 110b, 110c) of the plurality of sections (110a, 110b, 110c) are inductively coupled by a ferrite arranged around the metallic rod between the consecutive sections (110a, 110b, 110c) of the plurality of sections (110a, 110b, 110c).

The metallic rod may be formed continuously. For example, the metallic rod has no interruption. In this case, one ferrite, for example exactly one ferrite, can be arranged between the sections of the plurality of sections (110a, 110b, 110c). The sections of the plurality of sections (110a, 110b, 110c) may in this case be parts of the continuous metallic rod. Here, the inductive coupling may be provided by respective ferrites arranged around the metallic rod at distances corresponding to the respective dimensions of the sections of the plurality of sections (110a, 110b, 110c). The ferrites may be in the form of ferrite sleeve. They may be easily imposed on an already existing lightning rod. The ferrites may also be in the form of folding or foldable ferrites. These may also be easily arranged at an already existing lightning rod. Further, the ferrites may be in the form of an attachable ferrite tape, which can be easily attached at an already existing lightning rod.

A number of sections (110a, 110b, 110c) of the plurality of sections (110a, 110b, 110c) may be at least N. A number of the inductive coupling elements (120a, 120b) may be at least N-1. N may be a natural number greater than 3 (or 4 or 5 or 6 or 7 or 8 or 9 or 10).

In case of a segmented rod, the sections (110a, 110b, 110c) of the plurality of sections (110a, 110b, 110c) may be separated parts. These separated parts may be put together by concatenating the sections (110a, 110b, 110c) of the plurality of sections (110a, 110b, 110c) alternatively with the inductive coupling elements (120a, 120b) to form the lightning rod (100). In case of a single metallic rod, the lightning rod (100) may have the single metallic rod and separate inductive coupling elements (120a, 120b). These inductive coupling elements (120a, 120b) may specifically be arrangeable at or around the single metallic rod to form the lightning rod (100). The respective distances between the inductive coupling elements (120a, 120b) may be adaptable to the operating frequency. This may be even adjustable afterwards. Thus, after forming the lightning rod (100), the inductive coupling elements (120a, 120b) may be arranged differently at the lightning rod (100).

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g. FIG. 2-5).

Figure 2:
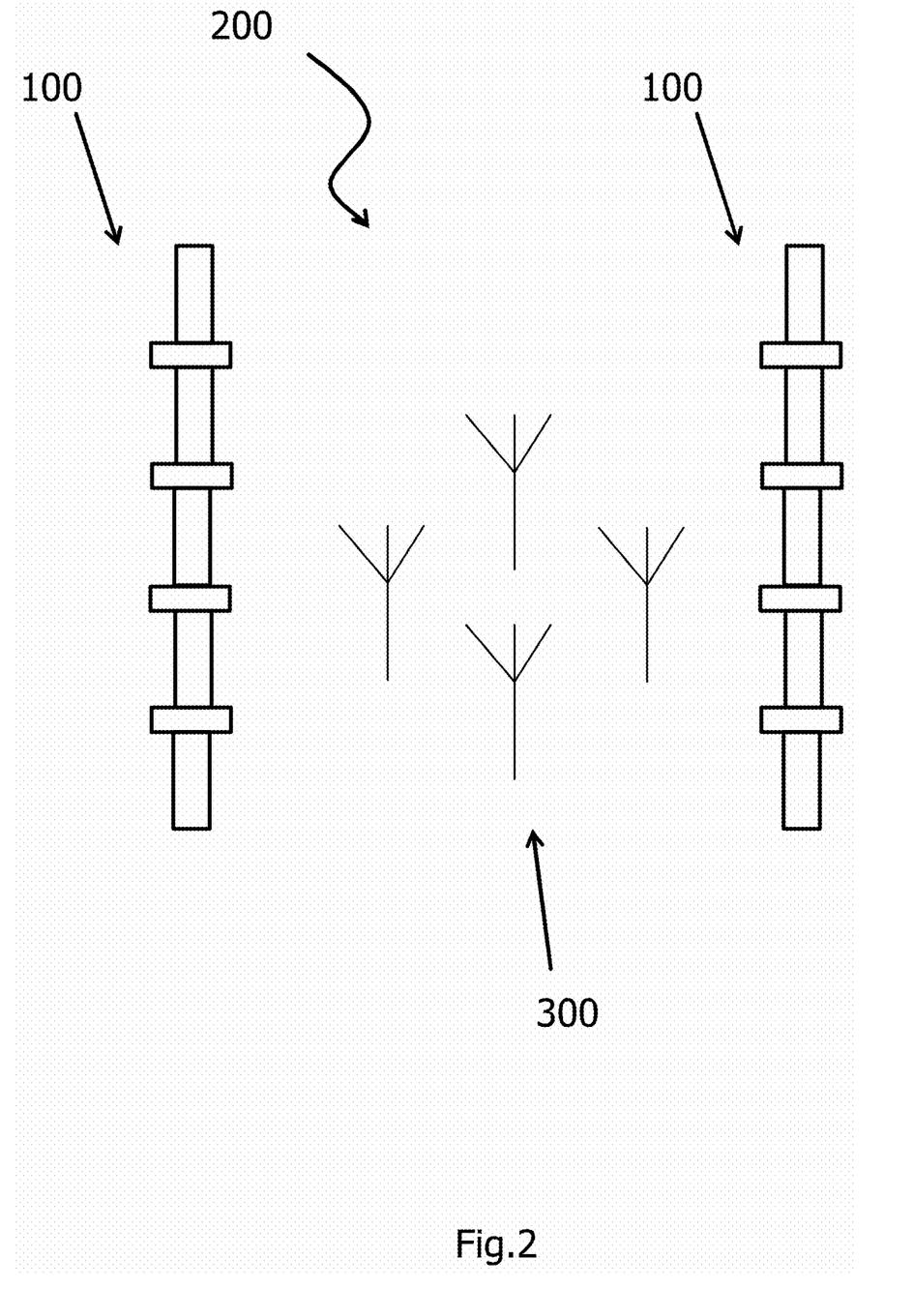
FIG. 2 schematically illustrates a system of a group of lightning rods and an antenna system.

FIG. 2 schematically illustrates a system (200) of a group of lightning rods (100) and an antenna system (300). In FIG. 2, the lightning rods (100) surround the antenna system (300).

The antenna system (300) may comprise or may be an antenna. The antenna system (300) may comprise or may be an antenna array. In FIG. 2, the antenna system (300) is illustrated as antenna array comprising four antennas. The antenna array may also comprise fewer or more antennas, for example, for direction finding purposes or communication purposes. Further, the antenna system (300) may also comprise downstream elements, for example a receiving unit and/or a transmitting unit. For example, the antenna system (300) may be part of a transmitter, receiver or a transceiver.

Each of the lightning rods (100) may be configured to be positioned at an exposed part of a building or other tall structure to divert lightning harmlessly into ground. For example, each of the lightning rods (100) may be used as or be a lightning arrester rod or a lightning arresting bar. Especially, each of the lightning rods (100) may be intended to protect the antenna system from a lightning strike.

If lightning is to hit the antenna system, it will preferentially strike the lightning rod(s) (100) and be conducted to ground through a wire, instead of passing through the structure, where it could start a fire. The Lightning rods (100) may also be called strike termination devices.

The respective dimensions of each of the plurality of sections (110a, 110b, 110c) may be less than one-sixth of the wavelength of the operating frequency of the antenna system (300) to be protected.

The operating frequency may be a frequency of an operating frequency range of the antenna system (300) to be protected.

The operating frequency may have a frequency between a lowest and highest frequency of the operating frequency range of the antenna system (300) to be protected. Specifically, the operating frequency may be a lowest frequency or a highest frequency of the operating frequency range of the antenna system (300) to be protected.

The lightning rod (100) according to the first aspect may be arranged in a vicinity/environment of the antenna system (300). The lightning rods (100) of the group of lightning rods (100) according to the fourth aspect may be arranged around the antenna system (300) in the vicinity of the antenna system (300).

The distance between the lightning rod(s) (100) and the antenna system (300) as well as the dimension of the lightning rod(s) (100) may be calculated using a method for determining protection areas, such as the rolling sphere method, the protective angle method, the mesh method or a combination thereof.

The dimension of the lightning rod(s) (100) may be defined as a vertical extension, for example a height. The lightning rod(s) (100) may also extend over the antenna system (300). This may be due to an inclination at an upper end of the lightning rod(s) (100) (inclined, aslant).

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g. FIG. 1) or below (e.g. FIG. 3-5).

Figure 3:
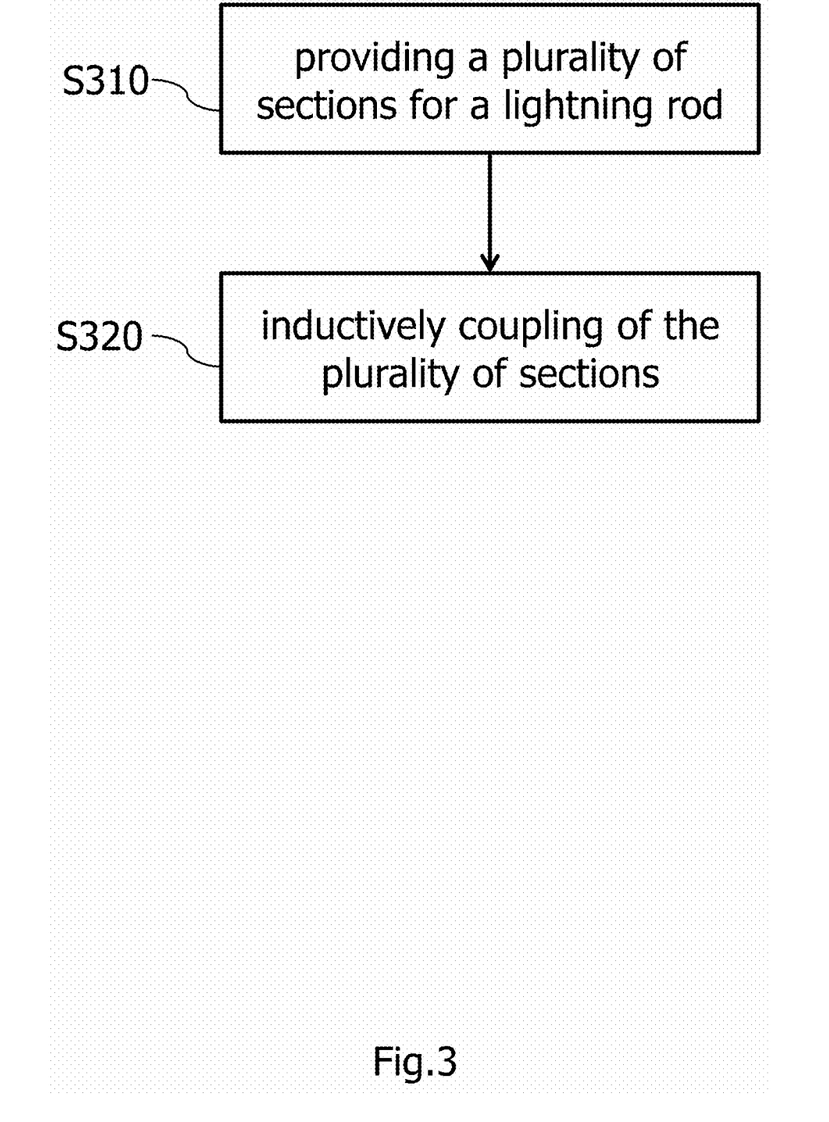
FIG. 3 schematically illustrates a method for protecting an antenna system against lightning strikes.

FIG. 3 schematically illustrates a method for protecting an antenna system against lightning strikes. The method comprises providing (S310) a plurality of sections for a lightning rod. Each section of the plurality of sections has a dimension less than a quarter of a wavelength according to an operating frequency. The method further comprises inductively coupling (S320) the plurality of sections to form the lightning rod. The lightning rod may also be extended (extendable) by further concatenating respective sections of the plurality of sections and inductive coupling elements (behind each other, alternatively). The so formed lightning rod may also be reducible or reduced, for example in case of a lower operating frequency.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g. FIG. 1-2) or below (e.g. FIG. 4-5).

Figure 4:
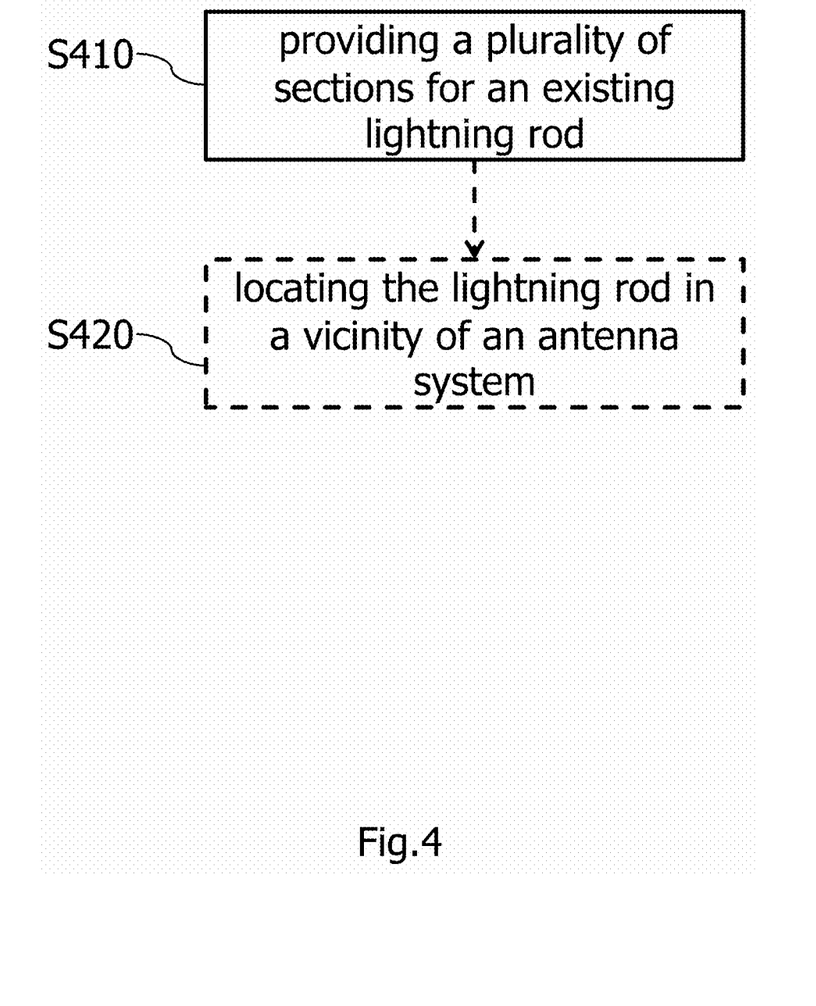
FIG. 4 schematically illustrates another method for protecting an antenna system against lightning strikes.

FIG. 4 schematically illustrates another method for protecting an antenna system against lightning strikes. The method comprises providing (S410) a lightning rod with inductive coupling elements at a distance to each other of less than a quarter of a wavelength according to an operating frequency. The distance to each other may also be, for example, as small as one-sixth of the wavelength according to the operating frequency. The lightning rod may be located (S420) in a vicinity of an antenna system to be protected. This method has the advantage that already existing lightning rods can be used to arrange inductive coupling elements at.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g. FIG. 1-3) or below (e.g. FIG. 5).

Figure 5:
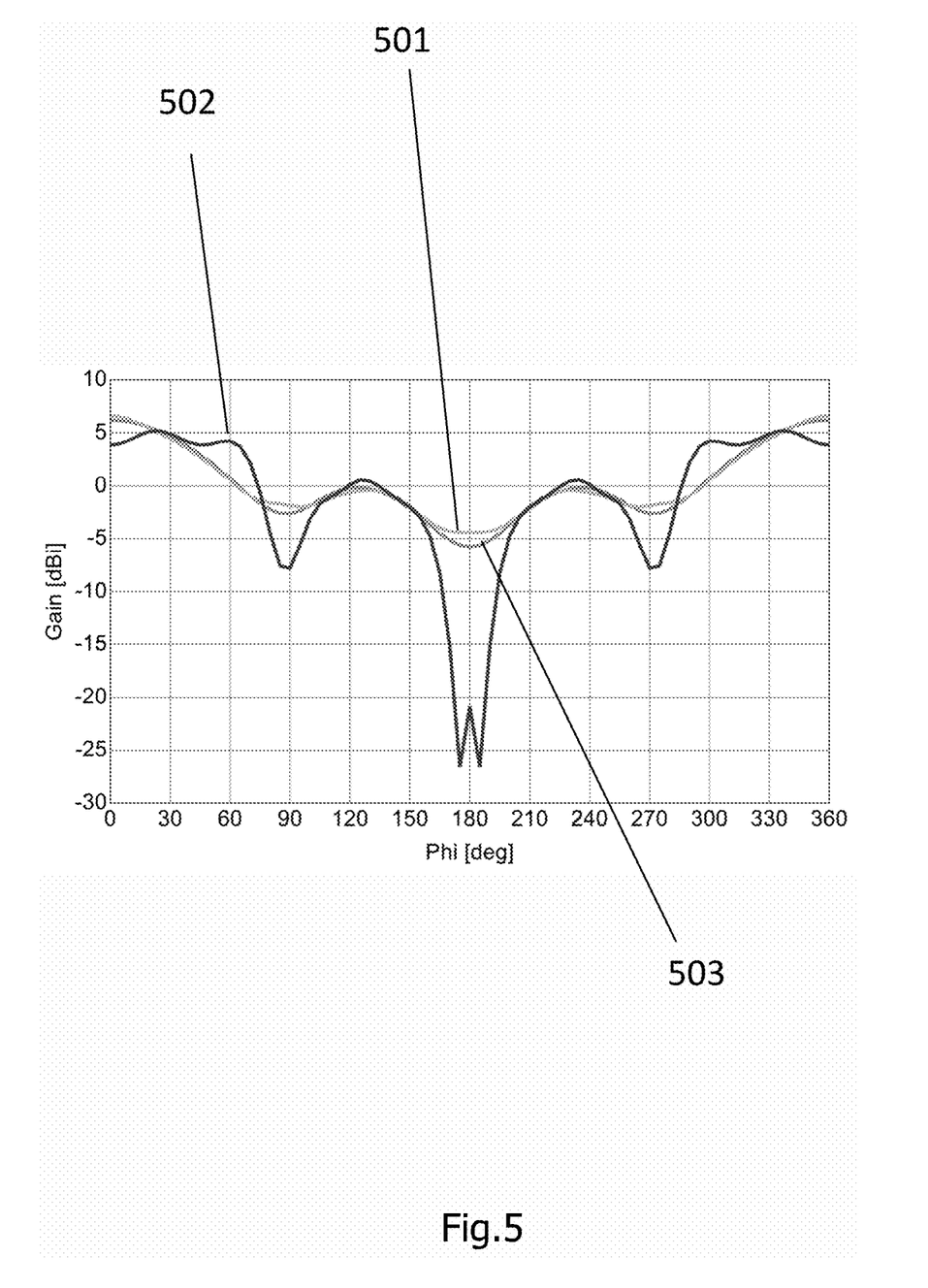
FIG. 5 schematically illustrates simulation results corresponding to different demonstrator arrangements of the system comprising lightning rods and an antenna system.

FIG. 5 schematically illustrates simulation results corresponding to different demonstrator arrangements of the system comprising lightning rods and an antenna system.

According to one or more embodiments, antennas may be located at exposed positions, such as rooftops or masts—that may need lightning protection. This lightning protection may have to protect connected equipment, as well as an operator in front of the equipment.

According to one or more embodiments, central lightning protecting rods (e.g., as part of the equipment) or surrounding lightning protection rods that are higher than the equipment to be protected may be provided. A few antenna types cannot, for example, handle central lightning protecting rods for mechanical or electrical reasons. Some of these antenna types (especially omni-directional and direction finding antennas) may have a reduced performance when metal rods are in their vicinity. Electric conducting material in the radiation area may reduce the antenna performance if its dimension reaches the order of magnitude of wavelength over 4.

According to one or more embodiments, lightning rods may overtop the antenna system to protect the antennas against impacts and, in the event of a lightning strike, carry the lightning current away from the antennas into a suitable grounding system.

According to one or more embodiments, the antenna characteristics may be maintained despite the provided lightning rods.

According to one or more embodiments, the lightning rods may be arranged in such a way that high-beam radio antennas ("small round bowls" for connection to a network of a provider) radiate past them. For example, a mobile antenna (GSM 900, 1800, UMTS, or LTE) may be arranged so that the lightning rods are behind them so that their broader antenna pattern is disturbed as little as possible. Lightning protection of a radar system may be similar. For example, part of the disadvantageous effects of conventional lightning rods in signal processing (near-end suppression, etc.) can be eliminated.

According to one or more embodiments, the measures described herein may be advantageously applied on lighting rods placed in front of or around an antenna system, for example for antennas which have an all-around antenna pattern (omni-directional).

According to one or more embodiments, in certain directions of radiation, a range to be intended, for example for coverage of mobile communication or radar, may be possible, even when using the lightning rods disclosed herein. This may be also applicable together with special antennas, such as array antennas, with the help of which the direction of incident electromagnetic waves are determined. For this type of antenna, the lightning rod may be provided at a central mast of the antenna, in particular at the tip.

There may be many applications in which a central mast lightning protection cannot take over, but individually distributed lightning rods may be required. The distributed lightning rods may offer some advantages:

The lightning current does not flow through the antenna mast and is further away from sensitive antenna elements, and thus can induce less interference, an omni-directional antenna can be operated at the top of the mast, and the antenna system to be protected does not have to be changed constructively.

According to one or more embodiments, the negative influence of the lightning rods in the operating frequency range of the antennas to be protected may be reduced. This can be done by dividing into segments. The length of the segments, for example, do not significantly exceed a length of wavelength (the operating frequency of the antenna) divided by 6. In order to maintain the actual function of the lightning rods, the segments may be properly connected. The connecting elements may have the task of effectively dissipating the lightning current while ensuring an electrical interruption in the working frequency range of the antenna. These connection elements between the segments can be realized by air coils, damped air coils or ferrites.

The effectiveness of the lightning rod disclosed herein is illustrated in FIG. 5. In FIG. 5, the undisturbed (without lightning rods) azimuth antenna diagram 501 of an antenna element is shown. The strongly distorted antenna diagram 502 results from four conventional lightning rods put in front of the antenna. By using the lightning rods described herein, the distortion may almost completely be eliminated and leads to the antenna diagram 503.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g. FIG. 1-4) or below.

According to one or more aspects, antenna systems with lightning protection may be provided.

Some of the above mentioned aspects and embodiments may provide easy application. Further, some of the embodiments may provide easy installation. Further, some of the embodiments may be built cheaply. Furthermore, an influence on antenna performance may be reduced, when installing a lightning rod according to one or more embodiments described herein next to an antenna equipped system.

The aspects and features mentioned and described together with one or more of the previously detailed examples and figures, may as well be combined with one or more of the other examples in order to replace a like feature of the other example or in order to additionally introduce the feature to the other example.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A lightning rod for protecting an antenna system, wherein the lightning rod comprises:
a plurality of sections, wherein each section of the plurality of sections extends in a longitudinal direction less than a quarter of a wavelength according to an operating frequency of the antenna system to be protected, wherein neighboring sections of the plurality of sections are inductively coupled,
wherein the sections of the plurality of sections are inductively coupled by inductive coupling elements, respectively, and
wherein
each of the inductive coupling elements has a dimension that is less than one half of a dimension of each of the plurality of sections, or
the inductive coupling elements include air coils.

2. The lightning rod of claim 1, wherein the plurality of sections are concatenated with each other in the longitudinal direction along a common direction of each of the plurality of sections.

3. The lightning rod of claim 1, wherein consecutive sections of the plurality of sections are directly connected by a respective one of the inductive coupling elements.

4. The lightning rod of claim 1, wherein the inductive coupling elements are coils with respective damping elements.

5. The lightning rod of claim 1, wherein the lightning rod has a metallic rod, and wherein consecutive sections of the plurality of sections are inductively coupled by a ferrite arranged around the metallic rod between the consecutive sections of the plurality of sections.

6. The lightning rod of claim 1, wherein the operating frequency is a frequency of an operating frequency range of the antenna system to be protected.

7. The lightning rod of claim 1, wherein a number of sections of the plurality of sections is at least N, and wherein a number of the inductive coupling elements is at least N-1, where N is a natural number greater than 3.

8. A lightning rod for protecting an antenna system, wherein the lightning rod comprises:
a plurality of sections, wherein each section of the plurality of sections extends in a longitudinal direction less than a quarter of a wavelength according to an operating frequency of the antenna system to be protected, wherein neighboring sections of the plurality of sections are inductively coupled,
wherein the sections of the plurality of sections are inductively coupled by inductive coupling elements, respectively, and
wherein
consecutive sections of the plurality of sections are directly connected by a respective one of the inductive coupling elements, or
a number of sections of the plurality of sections is at least N, and wherein a number of the inductive coupling elements is at least N-1, where N is a natural number greater than 3.

9. A lightning rod for protecting an antenna system, wherein the lightning rod comprises:
a plurality of sections, wherein each section of the plurality of sections extends in a longitudinal direction less than a quarter of a wavelength according to an operating frequency of the antenna system to be protected, wherein neighboring sections of the plurality of sections are inductively coupled,
wherein
the sections of the plurality of sections are inductively coupled by inductive coupling elements, respectively, and wherein the inductive coupling elements are coils with respective damping elements, or
the lightning rod has a metallic rod, and wherein consecutive sections of the plurality of sections are inductively coupled by a ferrite arranged around the metallic rod between the consecutive sections of the plurality of sections.

* * * * *